United States Patent
Gao et al.

(10) Patent No.: US 12,299,781 B2
(45) Date of Patent: May 13, 2025

(54) DEEP REINFORCEMENT LEARNING FOR COMPUTER ASSISTED READING AND ANALYSIS

(71) Applicant: Siemens Medical Solutions USA, Inc., Malvern, PA (US)

(72) Inventors: Fei Gao, Knoxville, TN (US); Vijay Shah, Knoxville, TN (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 322 days.

(21) Appl. No.: 17/310,771

(22) PCT Filed: Apr. 8, 2019

(86) PCT No.: PCT/US2019/026248
§ 371 (c)(1),
(2) Date: Aug. 23, 2021

(87) PCT Pub. No.: WO2020/209826
PCT Pub. Date: Oct. 15, 2020

(65) Prior Publication Data
US 2022/0044454 A1     Feb. 10, 2022

(51) Int. Cl.
*G16H 30/40*       (2018.01)
*G06F 18/21*       (2023.01)
(Continued)

(52) U.S. Cl.
CPC ........ *G06T 11/008* (2013.01); *G06F 18/2178* (2023.01); *G06N 3/045* (2023.01);
(Continued)

(58) Field of Classification Search
CPC ................ G06T 11/008; G06T 7/0012; G06T 2207/10104; G06T 2207/20081;
(Continued)

(56) References Cited

U.S. PATENT DOCUMENTS 10,032,281 B1    7/2018  Ghesu et al.
2008/0240337 A1* 10/2008 Galant ................... A61B 6/032
                                                                 378/20
(Continued)

OTHER PUBLICATIONS

International Search Report for corresponding application No. PCT/US2019/026248, dated Dec. 13, 2019.
(Continued)

*Primary Examiner* — Amandeep Saini
*Assistant Examiner* — Mehrazul Islam

(57) ABSTRACT

Methods and systems of revising image models for nuclear imaging are disclosed. A system receives first patient scan data corresponding to one or more nuclear imaging scans performed on one or more individuals and generates a first reconstructed image by applying a first image model to the first patient scan data. Feedback is received regarding the first reconstructed image and the feedback is provided as an input to a deep-reinforcement learning process. The deep-reinforcement learning process is configured to generate at least one modification for the first image model based on the feedback regarding the first reconstructed image. A second image model is generated by applying the at least one modification generated by the deep-reinforcement learning process to the first image model.

18 Claims, 4 Drawing Sheets

(51) Int. Cl.
G06N 3/045 (2023.01)
G06N 20/00 (2019.01)
G06T 7/00 (2017.01)
G06T 11/00 (2006.01)
G16H 50/20 (2018.01)

(52) U.S. Cl.
CPC .. *G06T 7/0012* (2013.01); *G06T 2207/10104* (2013.01); *G06T 2207/20081* (2013.01); *G06T 2207/20084* (2013.01)

(58) Field of Classification Search
CPC ......... G06T 2207/20084; G06T 11/006; G06F 18/2178; G06N 3/045
See application file for complete search history.

(56) References Cited

U.S. PATENT DOCUMENTS

| | | | | |
|---|---|---|---|---|
| 2009/0074278 | A1* | 3/2009 | Beaulieu | A61B 6/032 |
| | | | | 382/131 |
| 2012/0328173 | A1* | 12/2012 | Sachs | A61B 6/037 |
| | | | | 382/131 |
| 2017/0091963 | A1* | 3/2017 | Panin | A61B 6/5264 |
| 2017/0270695 | A1* | 9/2017 | Avinash | A61B 6/463 |
| 2017/0319154 | A1* | 11/2017 | Andreyev | A61B 6/037 |
| 2018/0005412 | A1* | 1/2018 | Ma | G06T 11/008 |
| 2018/0144466 | A1* | 5/2018 | Hsieh | G06N 3/08 |
| 2020/0161005 | A1* | 5/2020 | Lyman | G06N 5/04 |

OTHER PUBLICATIONS

Mufti Mahmud et al: "Applications of Deep Learning and Reinforcement Learning to Biological Data", arxiv.org, Cornell University Library, 201 Olin Library Cornell University Ithaca, NY 14853, Nov. 10, 2017 (Nov. 10, 2017).

Chenyang Shen et al: "Intelligent Parameter Tuning in Optimization-based Iterative CT Reconstruction via Deep Reinforcement Learning", arxiv.0rg, Cornell University Library, 201 Olin Library Cornell University Ithaca, NY 14853, Nov. 1, 2017.

Samuel Matej et al: "Efficient 3D TOF PET Reconstruction Using View-Grouped Histo-Images: DIRECT—Direct Image Reconstruction for TOF", 2006 IEEE Nuclear Science Symposium Conference Record; Oct. 29-Nov. 4, 2006; San Diego, CA, USA, IEEE Service Center, Piscatanay, NJ, USA, Oct. 1, 2006 (Oct. 1, 2006), pp. 1728-1735.

Wang, Lu et al., "Supervised Reinforcement Learning with Recurrent Neural Network for Dynamic Treatment Recommendation", arXiv:1807.01473v2 [cs.LG] , Sep. 17, 2018, 10 pages.

Alansary, Amir et al., "Automatic View Planning with Multi-scale Deep Reinforcement Learning Agents", arXiv:1806.03228v1 [cs.CV], Jun. 8, 2018, 8 pages.

Ali, Issa et al., "Lung Nodule Detection via Deep Reinforcement Learning", Frontiers in Oncology, Apr. 2018, vol. 8, Article 108, p. 1-7.

Mnih, Volodymyr et al., "Human-level control through deep reinforcement learning", Nature, vol. 518, Feb. 26, 2015, pp. 529-533.

Segasist Protate Auto-Conturing Software 510(k) Summary, Oct. 10, 2011, 7 pages.

Aljabar, P. and Gooding, M.J., "The cutting edge: Delineating contours with Deep Learning", 2017, 3.

* cited by examiner

DEEP REINFORCEMENT LEARNING FOR COMPUTER ASSISTED READING AND ANALYSIS

FIELD

Aspects of the present disclosure relate in general to nuclear imaging systems, and more particularly to model generation and refinement for nuclear imaging systems.

BACKGROUND

Time-of-flight (TOF) nuclear imaging, such as TOF positron emission tomography (PET), is used to construct two-dimensional and/or three-dimensional images of structures within a patient. TOF PET (and other TOF nuclear imaging) detects coincidence events representing near simultaneous detection of annihilation photon pairs using a pair of detectors. The TOF PET system determines the difference in time between the detection of the two photons (e.g., the time of flight) and localizes the point of origin of the annihilation event that occurred between the two detectors.

Nuclear imaging can be based on models generated for specific organs and/or body regions, such as lung models. Different clinical scenarios, such as surgery planning, primary care, post-surgery follow-up, or other scenarios, can require different models and no single model is a perfect fit in all clinical scenarios. Typically, long product lifecycles are required for implementing modified models based on physician or user feedback. Some user-specific requirements may not be amenable to incorporation into general models.

U.S. Pat. No. 10,032,281, which is owned by Siemens Healthcare GmbH, discloses multi-scale deep reinforcement learning for N-dimensional segmentation in medical imaging. The patent discloses applying deep reinforcement learning to determine the best N-dimensional segmentation. The N-dimensional segmentation is selected by one of statistical shape-modeling, front propagation modeling, or voxel mask modeling.

SUMMARY

In various embodiments, a method of revising image models for nuclear imaging is disclosed. First patient scan data corresponding to one or more nuclear imaging scans performed on one or more individuals is received and a first reconstructed image is generated by applying a first image model to the first patient scan data. Feedback regarding the first reconstructed image is received and provided as an input to a deep-reinforcement learning process. The deep-reinforcement learning process is configured to generate at least one modification for the first image model based on the feedback regarding the first reconstructed image. A second image model is generated by applying the at least one modification generated by the deep-reinforcement learning process to the first image model.

In various embodiments, a system receives first patient scan data corresponding to one or more nuclear imaging scans performed on one or more individuals and generates a first reconstructed image by applying a first image model to the first patient scan data. Feedback is received regarding the first reconstructed image and the feedback is provided as an input to a deep-reinforcement learning process. The deep-reinforcement learning process is configured to generate at least one modification for the first image model based on the feedback regarding the first reconstructed image. A second image model is generated by applying the at least one modification generated by the deep-reinforcement learning process to the first image model.

BRIEF DESCRIPTION OF THE DRAWINGS

The following will be apparent from elements of the figures, which are provided for illustrative purposes and are not necessarily drawn to scale.

DETAILED DESCRIPTION

This description of the exemplary embodiments is intended to be read in connection with the accompanying drawings, which are to be considered part of the entire written description.

Various embodiments of the present disclosure address the foregoing challenges with generating organ-specific models for use in nuclear imaging. In some embodiments, a system receives first patient scan data corresponding to one or more nuclear imaging scans performed on one or more individuals and generates a first reconstructed image by applying a first image model to the first patient scan data. Feedback is received regarding the first reconstructed image and the feedback is provided as an input to a deep-reinforcement learning process. The deep-reinforcement learning process is configured to generate at least one modification for the first image model based on the feedback regarding the first reconstructed image. A second image model is generated by applying the at least one modification generated by the deep-reinforcement learning process to the first image model.

Figure 1:
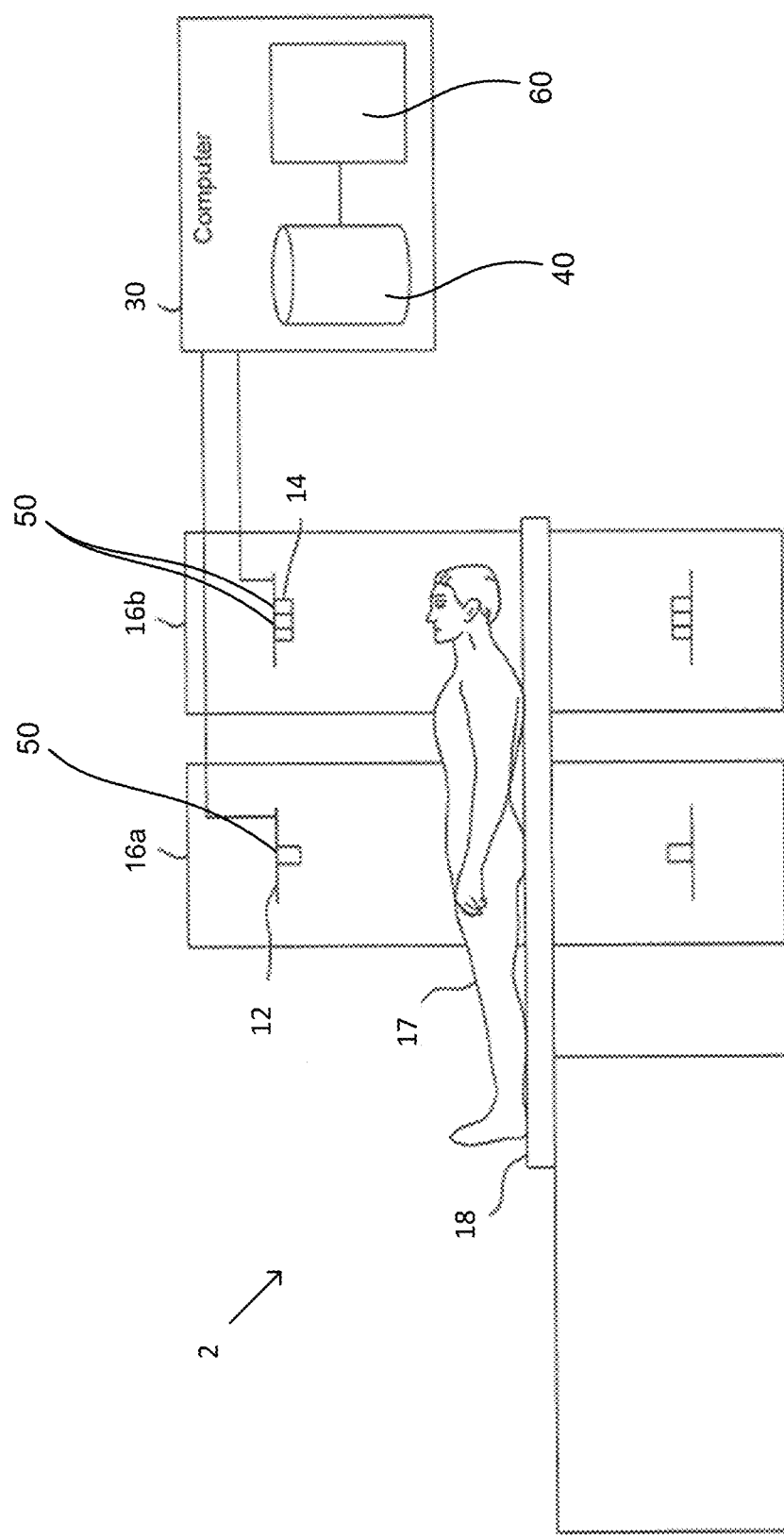
FIG. 1 illustrates a nuclear imaging system, in accordance with some embodiments.

FIG. 1 illustrates one embodiment of a nuclear imaging system 2. The nuclear imaging system 2 includes a scanner for at least a first modality 12 provided in a first gantry 16a. In various embodiments, the first modality 12 is a computerized tomography (CT) modality. A patient 17 lies on a movable patient bed 18 that may be movable between a gantry. In some embodiments, the nuclear imaging system 2 includes a scanner for a second imaging modality 14 provided in a second gantry 16b. The second imaging modality 14 can be any suitable imaging modality, such as, for example, photon emission tomography (PET) modality, single-photon emission tomography (SPECT) modality and/or any other suitable imaging modality. Each of the first modality 12 and/or the second modality 14 can include one or more detectors 50 configured to detect an annihilation photon, gamma ray, and/or other nuclear imaging event.

Scan data from the first modality 12 is stored at one or more computer databases 40 and processed by one or more computer processors 60 of a computer system 30. The graphical depiction of computer system 30 in FIG. 1 is provided by way of illustration only, and computer system 30 may include one or more separate computing devices. The imaging data sets can be provided by the first modality 12 and/or may be provided as a separate data set, such as, for example, from a memory coupled to the computer system

30. The computer system 30 can include one or more processing electronics for processing a signal received from one of the plurality of detectors 50.

Figure 2:
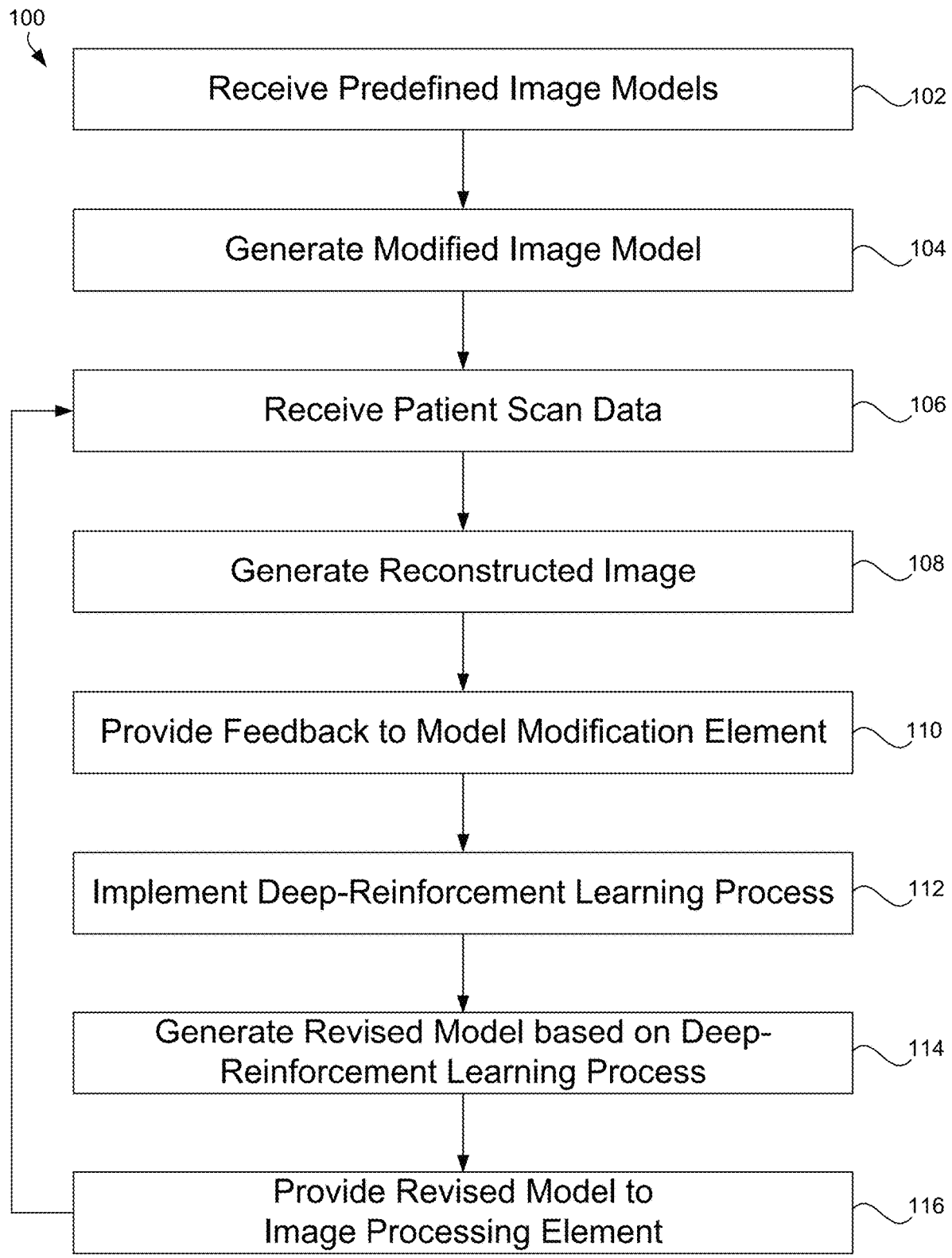
FIG. 2 is a flowchart illustrating a method of generating a contoured model using deep reinforcement learning, in accordance with some embodiments.
Figure 3:
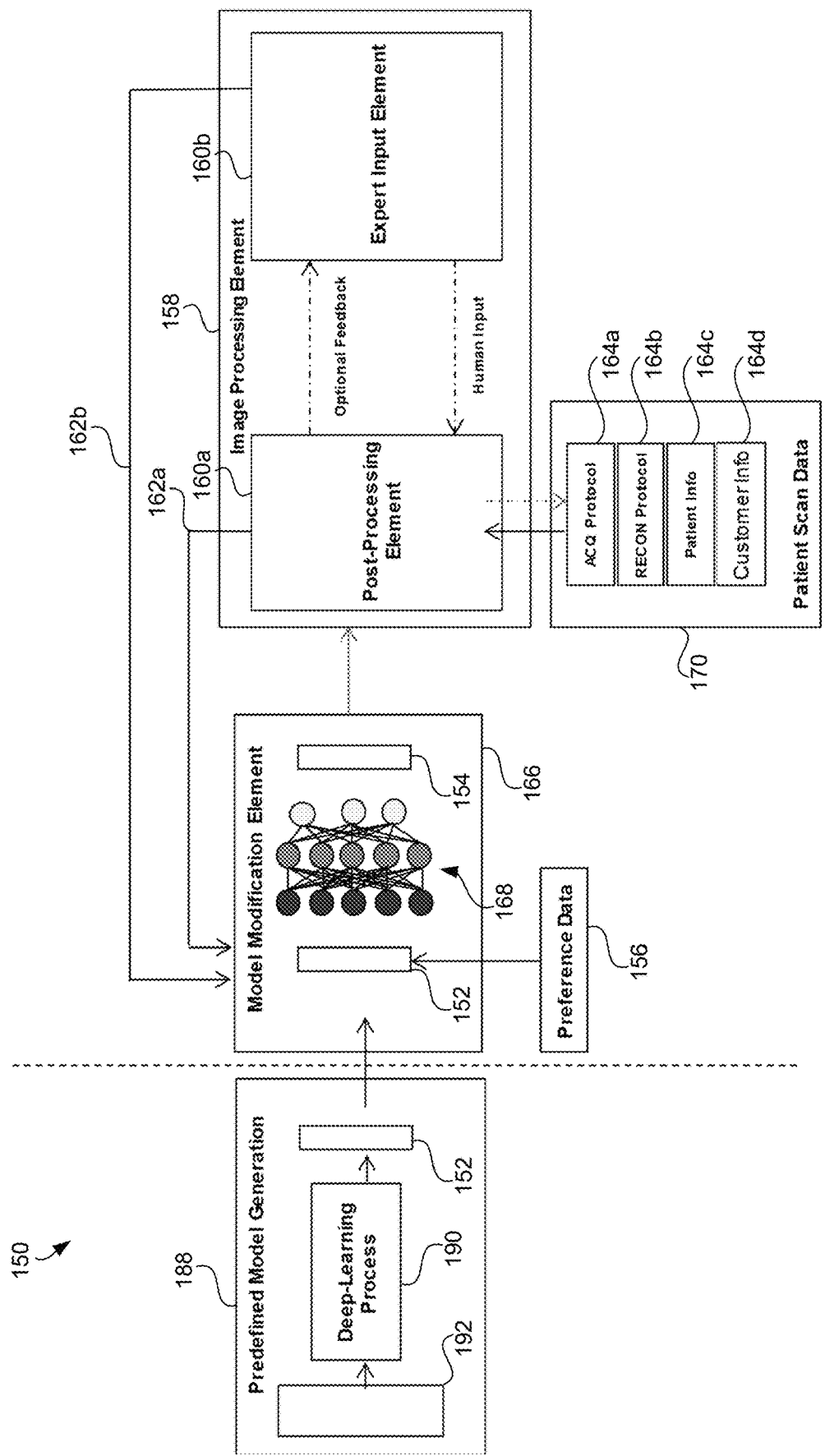
FIG. 3 illustrates a process flow for generating a contoured model according to the method of FIG. 2, in accordance with some embodiments.

FIG. 2 is a flowchart 100 illustrating a method of generating a contoured (or revised) image model, in accordance with some embodiments. FIG. 3 illustrates a process flow 150 for generating a refined model according to the method of FIG. 2. At step 102, a system, such as the computer system 30 illustrated in FIG. 1, receives one or more predefined models 152 corresponding to one or more scan regions, organs, or other structures of a patient. For example, in some embodiments, the predefined models 152 may include organ models (e.g., a lung model, a heart model, a brain model, etc.), region models (e.g., an abdominal region, a chest region, etc.), and or any other suitable medical imaging model. The predefined models 152 may be generated by using one or more predefined model generation processes 188 and provided in conjunction with, for example, an imaging system 2. In some embodiments, the predefined models 152 are generated according to a machine learning technique, such as a deep learning process 190, using a training data set 192 including scan data collected from a plurality of patients, model data, and/or any other suitable training data set. The predefined models 152 are configured for use during reconstruction of patient scan data obtained by one or more imaging modalities, such as, for example, imaging modalities 12, 14 in signal communication with the system 30.

At optional step 104, a model modification element 166 generates and provides one or more modified models 154. In some embodiments, the model modification element 166 is configured to receive patient-specific, user-specific, facility-specific, and/or other preference data and modifies the predefined models 152 according to the preference data. For example, in some embodiments, the preference data 156 can include machine-learning training sets applied by a machine learning process, such as a deep-learning process, as described in greater detail below with respect to steps 110-116. In other embodiments, the preference data may include standard modifications to the predefined models 152, such as, for example, a selection of one model from a plurality of possible models, selection of a portion of a model, exclusion of one or more models, etc.

At step 106 patient scan data 170 is received by the system. The patient scan data 170 may be received from any suitable source. For example, in some embodiments, patient scan data 170 is received in real-time from one or more imaging modalities 12, 14 in signal communication with the system, such as a first imaging modality 12 in signal communication with the system 30. The patient scan data 170 can include any suitable imaging data, such as TOF data for a plurality of annihilation events in a region of a patient corresponding to at least one of the predefined models 152. The scan data can include, but is not limited to, acquisition protocol data 164a, reconstruction protocol data 164b, patient information 164c, customer specific data 164d, event lists, scan parameters (e.g., slice sizes, etc.), target information (e.g., lung kernel/sections), and/or any other suitable data. In other embodiments, the patient scan data 170 includes data stored on one or more memory elements formed integrally with and/or in signal communication with the system 30.

At step 108, the system 30 generates a reconstructed image using a received image model, such as a predefined model 152 and/or a contoured model generated according to steps 106-114 described below, and the received patient scan data 170. For example, in some embodiments, the system 30 includes an image processing element 158 configured to map scan data (such as listmode mode), to locations identified by the image model to generate one or more reconstructed images for clinical review. The reconstructed images may include slices (or sections) generated by selecting predetermined slices of the image model, such as 1.5 mm slices. In some embodiments, individual portions of the patient scan data 170, such as a portion (or kernel) of an organ identified by a received image model, is extracted and processed for further review by a clinician or other user. The image processing element 158 may be further configured to implement one or more artifact reduction processes, such as, for example, an iterative metal artifact reduction (iMAR) process. The image processing element 158 uses one or more known techniques to generate reconstructed images based on the selected model(s) and the patient scan data. In some embodiments, the image processing element 158 includes a post-processing element 160a configured to generate a reconstructed image (e.g., read and analyze input data to generate the reconstructed image), report information regarding reconstructed image generation (e.g., errors in mapping data to the model, unmapped events, etc.), log data, and/or other suitable data.

In some embodiments, the image processing element 158 includes an expert input element 160b configured to receive input from a human expert, such as a doctor, imaging technician, or other medical professional. The input can include, but is not limited to, editing of the generated reconstructed image, selection of a portion of an reconstructed image, removing a portion of an reconstructed image, selection of one of a plurality of reconstructed images, customization of a reconstructed image, selection of a time period for an reconstructed image (e.g., time-limiting the event data used in the image generation), and/or any other suitable modification to the reconstructed image. In some embodiments, the human expert can provide an indication of the acceptability of the reconstructed image, for example, providing a score or threshold (e.g., good/not good) indication of the clinical value of the reconstructed image. The expert feedback can include time consuming edits to the reconstructed image to modify the reconstructed image, eliminate artifacts, correct defects, etc.

At step 110, the image processing element 158 provides feedback data 162a, 162b to the model modification element 166. The feedback data may include any suitable feedback data, such as system responses or data 162a, human expert responses or data 162b, and/or any other suitable feedback. In some embodiments, system responses may include, but are not limited to, data regarding artifact reductions, acquisition protocols, reconstruction protocols, customer-specific requirements, changes, cross-sections, scanner specific data or adjustments incorporated during generation of the reconstructed image, and/or any other system specific feedback. In some embodiments, human expert responses may include, but are not limited to, a score or threshold indication related to the reconstructed image and/or the received model, modifications to the reconstructed image or received model made by the human expert, and/or any other suitable feedback based on human expert interaction with the reconstructed image, image model, and/or image processing element 158. In some embodiments, the feedback data 162a, 162b includes a finalized diagnostic image used by the human expert for one or more diagnostic tasks, e.g., pre-surgery planning, post-surgery follow-up, primary care, etc. In some embodiments, the feedback data 162a, 162b includes text data, such as log files, protocol files, etc.

At step 112, the model modification element 166 implements a deep-reinforcement learning process 168 for updating the received predefined models 152 according to the feedback data received from the image processing element 158. The deep-reinforcement learning process 168 uses the feedback data as training data (i.e., labeled data having known ground truth) to identify features of interest, modifications, changes, and/or other policy alterations that beneficially revise one or more image models. For example, in some embodiments, the system 30 is configured to apply a convolution neural network to extract features from the feedback data 162a, 162b (i.e., the training data set), generate a plurality of fully connected layers for feature identification and extraction, and generate one or more model modification policies for modifying one or more image models.

In some embodiments, the deep-reinforcement learning process 168 includes a goal-oriented process configured to maximize the utility of each image model based on the feedback data 162a, 162b received from the image processing element 158. For example, in some embodiments, one or more agents are tasked with maximizing an optimal policy related to the changes, modifications, or selections made by the image processing element 158 based on the received scan data and/or adjustments made by a human expert. The adjustments made by the human expert may be related to planning considerations (e.g., surgical planning, primary care, post-surgery follow-up, etc.), model deficiencies, patient scan data deficiencies, reconstruction, artifact correction, etc. The deep-reinforcement learning process 168 considers each choice or modification made by the image processing element 158 and/or the human expert and generates modifications for one or more models that account for and predict user changes, uses, and/or preferences.

During the deep-reinforcement learning process 168, an agent (e.g., a machine-implemented process) repeatedly tries different actions from a set of available actions to gain experience, which is used to learn an optimal modification policy to predict image processing requirements. A policy determines for any possible state during the decision process the best action to perform to maximize future rewards. The rewards are set up in a way such that positive rewards are given for actions that lead beneficial model modifications (e.g., increase the accuracy of the image processing element 158, increase the average score provided by a human expert for a reconstructed image, reduce the average time a human expert spends modifying a reconstructed image, etc.), while negative rewards are given for experiments which provide little or no value to the decision-making process. Only positive or only negative rewards may be used. Experience from past decision-making processes may be used to define the rewards and the states and modifications for past patients may be used to learn the set of actions.

In some embodiments, the deep-reinforcement learning process 168 is configured to generate a modification policy (e.g., guidelines for modification of image models). The policy is generated based on specific feedback data 162a, 162b received from the image processing element 158. Different users, institutions, patient scan data, or other parameters may result in different feedback data sets 162a, 162b being generated for the same image model. For example, a first user may make a consistent modification to each reconstructed image generated using a first image model 152. However, a second user may not make the same modification or make a different consistent modification to each reconstructed image generated using the first image model 152. Thus, different users may generate different sets of feedback data, which may be combined and/or isolated by the deep-reinforcement learning process 168.

In some embodiments, the modification policy may be generated by a Markov decision process, dynamic programming, Q-learning, and/or any other suitable deep-reinforcement learning process. The deep-reinforcement learning process applies a feedback learning procedure that is used to generate an optimal (or preferred) model or model modification, referred to herein as a "policy." The model includes a plurality of states and state transitions that identify, for any given state, the optimal action (e.g., adjustment to the model) to be performed. Modifications that improve a model (e.g., beneficial modifications) are rewarded using a reward-feedback system implemented by the deep-reinforcement learning process. Similarly, modifications that do not improve or harm the model (e.g., neutral or detrimental modifications) are not rewarded and/or have negative rewards applied. In some embodiments, the deep-reinforcement learning process 168 may use prior iterations to generate reward structures, states, and/or other policy components.

Referring to FIG. 3, in the illustrated embodiment, the training data set for the deep-reinforcement learning process 168 includes the feedback data set 162a, 162b received from the image processing element 158. In some embodiments, the feedback data set 162a, 162b includes reconstructed images having known states, e.g., diagnostic/non-diagnostic quality, artefacts, applied reconstructions, user modifications, user application (e.g., surgical preplanning, diagnostic imaging, etc.). The feedback data set 162a may further include data regarding artifact reductions, acquisition protocols, reconstruction protocols, customer-specific requirements, changes, cross-sections, scanner specific data or adjustments incorporated during generation of the reconstructed image, other system specific feedback, a score or threshold indication related to the reconstructed image and/or the received model, modifications to the reconstructed image or received model made by the human expert, and/or other suitable feedback based on human expert interaction with the reconstructed image, image model, and/or image processing element 158. In some embodiments, the deep-reinforcement learning process 168 uses the feedback data sets 162a, 162b received from multiple imaging sessions to extract preferred modifications based on diagnostic reconstructed images and/or exclude common features of non-diagnostic images. The extracted features and/or modifications are used by the generated policy. The identified modifications that may be used to best or sufficiently improve one or more image models are selected by the deep-reinforcement learning process 168. For example, deep learning (e.g., deep structured learning, hierarchical learning, or deep machine learning) uses high-level abstractions in data by applying multiple processing layers with structures composed of multiple non-linear transformations, where the input data features are not engineered explicitly. A deep-reinforcement learning process 168 (such as a deep neural network) processes the input via multiple layers of feature extraction to isolate beneficial modifications capable of improving image models. Other deep learning, sparse auto-encoding models may be trained and applied. In some embodiments, the deep-reinforcement learning process 168 is unsupervised in learning the modifications to use and how to classify given an input sample (i.e., feedback data sets 162a, 162b).

In embodiments including text data in the feedback data set 162a, 162b such as textual log files, textual protocol files, etc., the deep-reinforcement learning process 168 may be configured to perform text analysis. The text analysis may be based on simple comparisons and/or integration of the text data and/or may include a deep-reinforcement learning process 168 configured to analyze the textual information through one or more implemented networks (e.g., text evaluation networks).

In some embodiments, the computer system 30 filters the feedback data sets 162*a*, 162*b* provided from the image processing element 158 prior to generating the training data set for the deep-reinforcement learning process 168. For example, the system 30 may weigh the provided feedback data points within the feedback data sets 162*a*, 162*b* based on one or more predetermined weighting factors. In some embodiments, feedback provided by a first source, such as human expert provided feedback, may be weighted higher than feedback provided by a second source, such as feedback regarding operation of the nuclear imaging scanner. As another example, in some embodiments, a first subset of the provided feedback data sets 162*a*, 162*b* may be provided to the deep-reinforcement learning process 168 and a second subset of the provided feedback data sets 162*a*, 162*b* may be withheld and/or provided to a second agent implemented by the deep-reinforcement learning process 168.

In some embodiments, a deep Q-learning process is configured to combine the advantages of automatic image-feature extraction with effective finite-horizon policy learning. An action space may be proportional to an image space. In one alternative, action embedding in combination with policy gradient is used to exploit the intrinsically sparse structure of a relevant action space. In another embodiment, natural evolution strategies (NES) performs the policy exploration in parameter space as part of the learning. NES is particularly suited given the compact parametrization of fully-convolutional networks. Other approaches for deep reinforcement learning may be used.

In some embodiments, the deep-reinforcement learning process 168 provides a multi-scale deep reinforcement machine-learnt imaging model. The imaging model is trained to provide reconstruction of nuclear scan data received from an imaging modality. In some embodiments, a single reconstruction is generated using a first imaging model generated, for example, by a prior deep-reinforcement learning process and/or may provide a default reconstruction based on a default model or default settings of the system 30. Patient scan data is captured by the imaging modality and the model is applied to the data to reconstruct an image of a patient region, organ, and/or other imaging target. The model may be organ specific (e.g., lung models, heart models, etc.) or may include multiple organs or tissue sections (e.g., an abdominal region containing multiple organs or tissue sections of interest).

During each iteration of the deep-reinforcement learning process 168, the model modification element 166 modifies a preexisting image model, such as a predefined model 152 and/or refined image model generated during a prior iteration of the deep-reinforcement learning process 168, to incorporate the beneficial modifications identified using the feedback data sets 162*a*, 162*b*. The refined image models change one or more aspects of the prior image models, refining, for example, location of tissues sections or organs, relative size of tissue sections or organs, internal structures of tissue sections or organs, and/or any other suitable model elements. For each iteration, the best-fit model based on the prior model and feedback data set is generated by the deep-reinforcement learning process 168. The policy generated by the deep-reinforcement learning process 168 controls the modifications made to the models given the context of such modifications (e.g., modification for surgical pre-planning, modification for diagnostic imaging, etc.). The generated policy provides state-changes for applying modifications to each prior model to generate a contoured model that better meets user and/or scanner requirements and expectations.

In some embodiments, the deep-reinforcement learning process 168 is applied to the feedback data sets 162*a*, 162*b* iteratively until a stop condition or stop criteria is met. Any suitable stop condition may be used. For example, in some embodiments, a deep-reinforcement learning process 168 may continue until the same or similar refinements are generated for similar prior models. Although specific embodiments are discussed herein, it will be appreciated that any suitable stop condition(s) can be applied by the deep-reinforcement learning process 168. The deep-reinforcement learning process 168 can be configured to updated models for any suitable use, such as, for example, a longitudinal study, multiple follow-ups, treatment planning, outcome prediction, delay effects in clinical studies, and/or any other use.

In some embodiments, multiple reconstructions may be generated by the computer system 30 using different imaging modalities 12, 14, different predefined models 152, and/or different reconstruction parameters. For example, in some embodiments a dual-modality scan (such as a SPECT/CT scan) is performed and reconstructions are generated for each image modality. Multiple reconstructions may be generated for each modality, such as, for example, a CT reconstruction for attenuation correction, a CT reconstruction for organ/tissue reading, a CT reconstruction for surgery planning, etc. For each generated reconstruction and/or modality, the model modification element 166 can implement separate deep-reinforcement learning processes 168 based on feedback from each individual reconstruction, modality, and/or combined scan. In some embodiments, the separate deep-reinforcement learning processes may be independent and/or interrelated.

At step 114, the model modification element 166 outputs a contoured model based on the deep-reinforcement learning process 168. For example, if the deep-learning process extracts a first beneficial modification from the feedback data received from the image processing element 158, the model modification element 166 generates a contoured image model incorporating and/or adjusted according to the extracted first modification. The use of a contoured model generated by the model modification element 166 improves the quality of reconstructed images (e.g., clinical diagnostic images) generated by the image processing element 158 and generates reconstructed image models adjusted for specific needs of users (e.g., doctors, imaging technicians, etc.). For example, once a contoured model is generated, a user no longer need make time consuming edits that have been incorporated into the contoured model based on the deep-reinforcement learning process 168.

In some embodiments, the deep-reinforcement learning process 168 is configured to directly generate one or more contoured models. For example, the output of each iteration of the deep-reinforcement learning process 168 includes one or more contoured models. In other embodiments, the deep-reinforcement learning process 168 generates a modification policy that can be applied to existing predefined models 152 to generate contoured models. The modification policy may include data for modifying each model according to the extracted features such that multiple predefined models can be adjusted based on a single feedback data set 162*a*, 162*b*.

The feedback data set 162a, 162b may be based on the same, similar, and/or different models as the models modified by the modification policy.

In some embodiments, the model modification element 166 is configured to incorporate feedback iteratively such that model modifications may be made with a smaller number of training data sets, e.g., fewer feedback data points. The model modification element 166 can be configured to generate contoured models after a predetermined number of feedback events have been received. In some embodiments, the model modification element 166 generates contoured models at a first rate and provides contoured models to the image processing system 158 at a second rate such that updates to the image models used by the image processing element 158 occur less frequently than generation of new models by the model modification element 166. By delaying deployment of models, the computer system 30 may avoid interrupting in-process workflows, obtain additional feedback for generating contoured models, and/or prevent inconsistencies in reconstructed images generated for a user during a single imaging session.

The model modification element 166 may be configured to implement the deep-reinforcement learning process 168 on a rolling basis and/or using batch processing. For example, in embodiments incorporating feedback on a rolling basis, the model modification element 166 is configured to add each feedback data set 162a, 162b to a training data set and execute deep-reinforcement learning process 168 for each updated training set. As another example, in embodiments incorporating feedback using batch processing, the model modification element 166 is configured to accumulate a predetermined number of feedback data sets. The model modification element 166 executes the deep-reinforcement learning process 168 only after a predetermined threshold number of feedback data sets have been received, a predetermined time period has elapsed, and/or according to any other suitable trigger.

At step 116, the contoured model is provided to the image processing element 158 and is used to generate additional reconstructed images from additional patient scan data. For example, the contoured model may include adjustments to acquisition protocols, reconstruction protocols, artifact reduction protocols, and/or other protocols related to collecting and interpreting scanner events. The method 100 returns to step 106 and receives new patient scan data, related to the same and/or a different patient. The system 30 iterates through steps 106-116 of the method 100 during each subsequent scan, refining the models based on feedback data from each subsequent scan. After several iterations, the contoured model will include a user-specific model configured to meet the specific preferences and requirements of a user (e.g., doctor, technician, facility, etc.).

Figure 4:
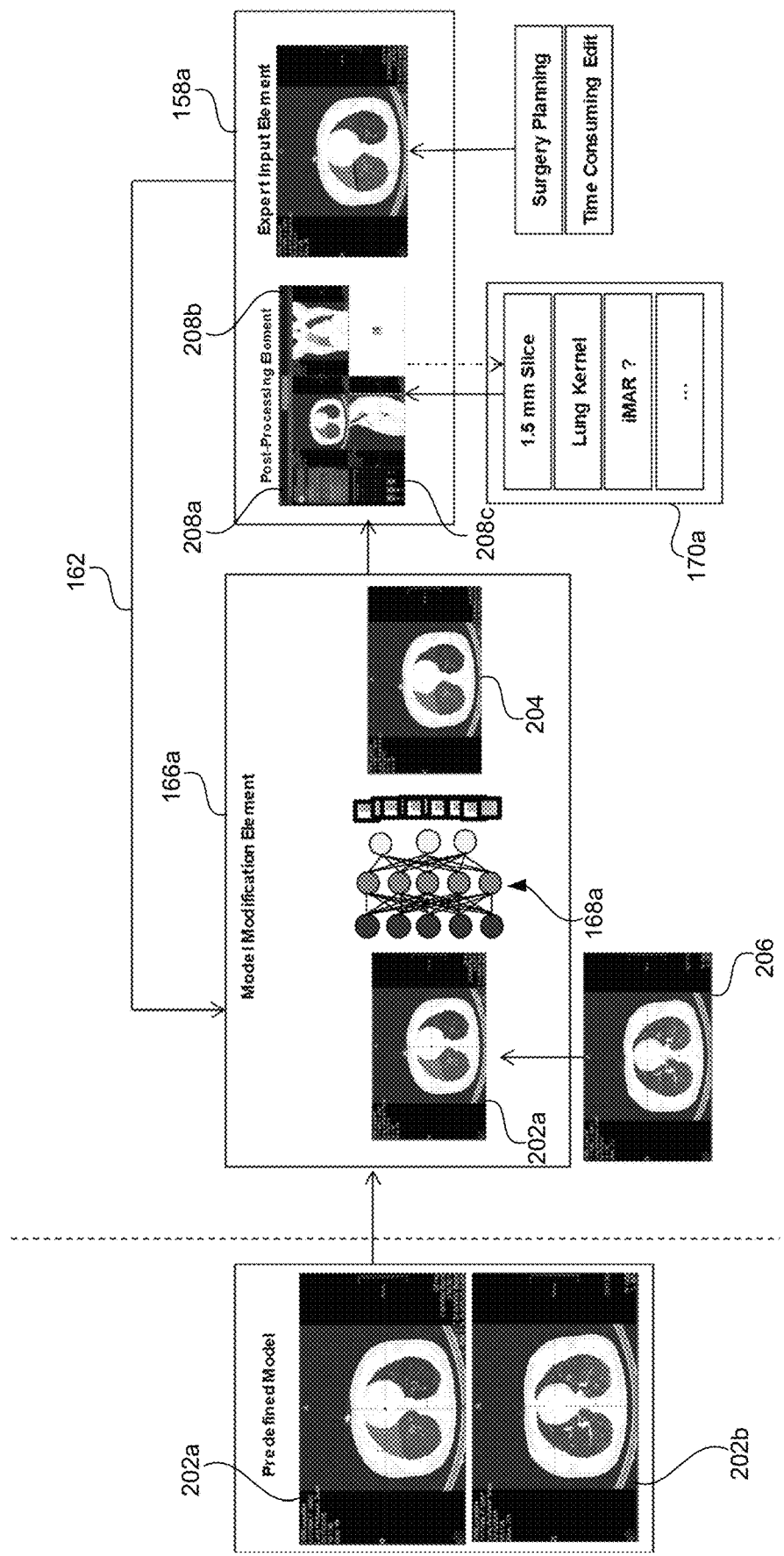
FIG. 4 illustrates a model-specific workflow for generating a contoured organ model, in accordance with some embodiments.

FIG. 4 illustrates a model-specific workflow 200 for generating individualized organ models according to the method of FIG. 2, in accordance with some embodiments. With reference to FIGS. 2 and 4, one or more predefined lung models 202a, 202b are received by a model modification element 166a. The model modification element 166a also receives a training data set 206 generated during prior iterations of the deep-reinforcement learning process 168a associated with a specific user. The model modification element 166a applies the deep-reinforcement learning process 168a to modify the received predefined models 202a, 202b based on the received training data set 206. User-specific contoured models 204 are provided to an image processing element 158a for use in one or more image reconstructions.

The image processing element 158a receives patient scan data 170a from one or more imaging modalities. The received patient scan data 170a can include any suitable scan data, such as, for example, event lists, scan parameters (e.g., slice sizes, etc.), target information (e.g., lung kernel/ sections), reconstruction information, artifact reduction information, and/or any other suitable scan information. The image processing element 158a generates one or more reconstructed images 208a-208c based on the patient scan data 168a. The image processing element 158a generates a feedback data set 162 based on the reconstruction of the image, the first of the patient scan data 170a to the one or more image models, data provided by the imaging modality, and/or other suitable system generated feedback. In some embodiments, a human expert reviews the reconstructed images 208a-208c and performs one or more modifications (or edits). The image processing element 158a generates a feedback data set 162 including the modifications performed by the human expert, a final reconstructed image, and/or any other suitable feedback.

The feedback data set 162 is provided from the image processing element 158a to the model modification element 166a. The model modification element 166a combines the received feedback data set 162 into a single training data set that is provided to the deep-reinforcement learning process 168a. The deep-reinforcement learning process 168a uses the training data set, as discussed above, to generate one or more modifications for the image models. The model modification element 166a generates new image models based on the deep-reinforcement learning process 168a and provides the new image models to the image processing element 158a for use in future lung scans. The feedback between the image processing element 158a and the model modification element 166a continues for each subsequent set of feedback data that is provided to the model modification element 166a, improving the image models used by the image processing system 158a iteratively.

The apparatuses and processes are not limited to the specific embodiments described herein. In addition, components of each apparatus and each process can be practiced independent and separate from other components and processes described herein.

The previous description of embodiments is provided to enable any person skilled in the art to practice the disclosure. The various modifications to these embodiments will be readily apparent to those skilled in the art, and the generic principles defined herein may be applied to other embodiments without the use of inventive faculty. The present disclosure is not intended to be limited to the embodiments shown herein, but is to be accorded the widest scope consistent with the principles and novel features disclosed herein.

What is claimed is:

1. A method of revising image models for nuclear imaging, comprising:
    receiving, by a system, first patient scan data corresponding to a nuclear imaging scan of an individual;
    receiving, by the system, preference data associated with the first patient scan data;
    selecting, by the system, a first image model from a plurality of image models based on at least a first portion of the preference data, and modifying, by the system, the first image model based on at least a second portion of the preference data;
    generating, by the system, a first reconstructed image by applying the first image model to an entirety of the first patient scan data, the first reconstructed image comprising an imaging target at a first location;

receiving, by the system, a feedback regarding the first reconstructed image;

generating weighted feedback based on applying a first weight to a first portion of the feedback and a second weight to a second portion of the feedback;

providing, by the system, the weighted feedback as an input to a deep-reinforcement learning process, wherein the deep-reinforcement learning process is configured to extract features from the weighted feedback, and generate at least one modification for the first image model based on the extracted features of the weighted feedback regarding the first reconstructed image;

generating, by the system, a second image model by applying the at least one modification generated by the deep-reinforcement learning process to the first image model;

generating, by the system, a second reconstructed image by applying the second image model to the entirety of the first patient scan data, the second reconstructed image comprising the imaging target at a second location that is different from the first location.

2. The method of claim 1, wherein the first image model is a predefined image model.

3. The method of claim 1, wherein the feedback comprises system generated feedback or expert generated feedback.

4. The method of claim 3, wherein the system generated feedback comprises an artifact reduction, an acquisition protocol, or a reconstruction protocol.

5. The method of claim 3, wherein the expert generated feedback comprises a score indicative of an acceptability of the first reconstructed image or the at least one modification.

6. The method of claim 1, wherein the feedback comprises a modified reconstructed image.

7. The method of claim 1, wherein the deep-reinforcement learning process comprises a convolution neural network or a text evaluation network.

8. The method of claim 1, comprising:
receiving, by the system, second patient scan data corresponding to one or more additional nuclear imaging scans; and
generating, by the system, a third reconstructed image by applying the second image model to the second patient scan data.

9. The method of claim 1, wherein the preference data comprises machine-learning training sets.

10. The method of claim 9, wherein the method comprises training the deep-reinforcement learning process based on the machine-learning training sets, wherein the trained deep-reinforcement learning process is configured to extract the features from the weighted feedback.

11. A system, comprising:
an imaging modality configured to generate patient scan data in response to a nuclear imaging scan of an individual during a first imaging period; and
a computer configured to:
receive the patient scan data generated during the first imaging period;
receive preference data associated with the first patient scan data;
select a first image model from a plurality of image models based on at least a first portion of the preference data, and modify the first image model based on at least a second portion of the preference data;

generate a first reconstructed image by applying the first image model to an entirety of the patient scan data, the first reconstructed image comprising an imaging target at a first location;
receive a feedback regarding the first reconstructed image;
generate weighted feedback based on applying a first weight to a first portion of the feedback data and a second weight to a second portion of the feedback data;
provide the weighted feedback as an input to a deep-reinforcement learning process, wherein the deep-reinforcement learning process is configured to extract features from the weighted feedback, and generate at least one modification for the first image model based on the extracted features of the weighted feedback regarding the first reconstructed image;
generate a second image model by applying the at least one modification generated by the deep-reinforcement learning process to the first image model;
generate a second reconstructed image by applying the second image model to the entirety of the first patient scan data, the second reconstructed image comprising the imaging target at a second location that is different from the first location.

12. The system of claim 11, wherein the feedback comprises one or more of system generated feedback or expert generated feedback.

13. The system of claim 12, wherein the system generated feedback comprises one or more of an artifact reduction, an acquisition protocol, or a reconstruction protocol.

14. The system of claim 12, wherein the expert generated feedback comprises one or more of a score indicative of an acceptability of the first reconstructed image or the at least one modification.

15. The system of claim 11, wherein the feedback comprises a modified reconstructed image.

16. The system of claim 11, wherein the imaging modality is configured to generate patient scan data during a second imaging period, and wherein the computer is further configured to:
receive the patient scan data generated during the second imaging period; and
generate a third reconstructed image by applying the second image model to the patient scan data generated during the second imaging period.

17. A non-transitory computer readable medium storing instructions configured to cause a computer system to execute the steps of:
receiving first patient scan data corresponding to a nuclear imaging scan of an individual;
receiving preference data associated with the first patient scan data;
selecting, by the system, a first image model from a plurality of image models based on at least a first portion of the preference data, and modifying, by the system, the first image model based on at least a second portion of the preference data;
generating a first reconstructed image by applying the first image model to an entirety of the first patient scan data, the first reconstructed image comprising an imaging target at a first location;
receiving a feedback regarding the first reconstructed image;

generating weighted feedback based on applying a first weight to a first portion of the feedback data and a second weight to a second portion of the feedback data;

providing the weighted feedback as an input to a deep-reinforcement learning process, wherein the deep-reinforcement learning process is configured to extract features from the weighted feedback, and generate at least one modification for the first image model based on the extracted features of the weighted feedback regarding the first reconstructed image;

generating a second image model by applying the at least one modification generated by the deep-reinforcement learning process to the first image model; and generating a second reconstructed image by applying the second image model to the entirety of the first patient scan data, the second reconstructed image comprising the imaging target at a second location that is different from the first location.

18. The non-transitory computer readable medium of claim 17, wherein the instructions are further configured to cause the computing system to execute the steps of:

receiving second patient scan data corresponding to one or more additional nuclear imaging scans; and generating a third reconstructed image by applying the second image model to the second patient scan data.

* * * * *